3,332,897
PROCESS OF GRAFTING MONOMERS ONTO POLYSACCHARIDES, AND ACYLATING PRODUCT TO OBTAIN AN ESTER
Dilip Kumar Ray-Chaudhuri, Westfield, N.J., assignor to National Starch and Chemical Corporation, New York, N.Y., a corporation of Delaware
No Drawing. Filed Dec. 21, 1964, Ser. No. 420,112
10 Claims. (Cl. 260—17.4)

ABSTRACT OF THE DISCLOSURE

A process for preparing polysaccharide esters and the polysaccharide esters thus obtained; said process comprising the step of simultaneously polymerizing and grafting an ethylenically unsaturated monomer onto the molecule of a polysaccharide and thereafter reacting the grafted polysaccharide, in the presence of a catalyst, with an acylating agent selected from the group consisting of acetic, propionic or butyric anhydrides or any combination of the latter anhydrides.

This invention relates to a novel method for the preparation of polysaccharide ester derivatives as well as to the novel derivatives thereby prepared.

Known methods of direct esterification of polysaccharides entail a number of difficulties. One such difficulty, which has been characteristic of all classes of polysaccharides, has involved the preparation of polysaccharide ester derivatives in forms suitable for further conversion into films and fibers, etc. Thus, products prepared solely by the reaction between a polysaccharide and the appropriate acid anhydride, in an acidic system, cannot be molded easily, if at all. For the most part such molded products are brittle and inflexible and thus entirely unsuitable for commercial utilization.

To overcome these difficulties, plasticizers, i.e. compounds which impart permanent characteristics of flexibility and workability to the end products of which they form a part, are often incorporated into polysaccharide ester derivatives. Thus, relatively low molecular weight plasticizers, such as dioctyl phthalate, have been added to aid in compounding and molding as well as in modifying the properties of the finished product. This approach, however, while solving many of the original problems of brittleness and inflexibility has, in turn, raised new problems. Thus, for example, one is faced with increased expense, poor plasticizer compatibility and the need for new solvent systems. In addition, care must be taken in order to avoid the tendency of the plasticizer to become physically separated from the polysaccharide ester under conditions of temperature change or mechanical stress. Thus, the beneficial effect of the plasticizer may be lost by slow evaporation as well as by bleeding out of the product or upon its being leeched out by solvents. It is also essential to prevent migration of the plasticizer in order to maintain the desired properties.

Another problem which is particularly applicable to the preparation of starch ester derivatives, is the difficulty of direct esterification and the considerable degradation of the starch molecule which often accompanies the reaction. Thus, for example, intact granule starches react slowly toward most esterification reagents in that they strongly resist the penetration of most organic esterification media.

In order to overcome this difficulty, the technique of gelatinizing, i.e. swelling and/or disintegrating, the starch granule prior to the addition of the esterification reagent has been resorted to. However, processes depending on the gelatinization of the starch granule through the use of high temperature, acids, concentrated solutions of acid salts and oxidizing agents, etc., often result in the extensive degradation of the starch molecule. Thus, while transforming the starch into a more easily esterifiable product, the gelatinization often causes considerable chemical degradation and physical alteration of the starch molecule.

It is the prime object of this invention to provide a method for the esterification of polysaccharides whereby polymer chains are grafted onto the polysaccharide molecule and the resulting grafted polysaccharide is thereupon acylated, i.e. esterified. It is a further object to provide an esterification procedure which achieves a high degree of esterification within a short reaction period while yielding non-degraded polysaccharide derivatives. An additional object of this invention is the preparation of internally plasticized polysaccharide esters which are characterized by their excellent molding properties, high degree of thermoplasticity, good electrical insulation properties as well as by the unusual flexibility of the films derived therefrom.

Thus, in contrast to the above noted prior known esterification techniques, this invention involves a procedure for esterifying polysaccharides which eliminates all of the above mentioned deficiencies. The process of this invention comprises reacting polysaccharides, in an aqueous medium, with an ethylenically unsaturated, i.e. vinyl monomer in the presence of a free radical initiator; isolating the resulting grafted polysaccharide intermediate; reacting the thus obtained intermediate with an acylating agent in the presence of a catalyst and thereupon recovering the resulting grafted polysaccharide ester.

The novel derivatives of this invention thus comprise polysaccharides having polymeric side chains grafted onto the polysaccharide molecule via a portion of their hydroxyl groups with other hydroxyl groups of the polysaccharide molecule being substituted with acyl groups. The grafted polymeric side chains comprise repeating units resulting from the procedure whereby an ethylenically unsaturated monomer is simultaneously polymerized and grafted onto the polysaccharide molecule. Thus, as based on the acylation and graft attachment upon the individual glucose mers of the polysaccharide molecule, a representative mer of the grafted polysaccharide acylate compounds of this invention corresponds to the following formula:

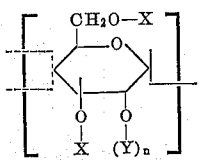

wherein X is an acyl radical selected from the group consisting of the acetate, propionate and butyrate radicals and mixtures of the latter radicals; wherein Y is the repeating unit of the grafted polymeric chain resulting from the simultaneous polymerization and grafting of an ethylenically unsaturated monomer onto the polysaccharide molecule; and, wherein $n$ is an integer having a value of at least 100.

As has been noted hereinabove, and as may be seen from an inspection of the above formula, Y, the repeating unit of the grafted polymer chain, is linked to the polysaccharide molecule via an oxygen atom of a hydroxyl group of the latter molecule. This notation, however, does not preclude the possibility that the grafted polymer chains are directly linked to the polysaccharide molecule via a carbon atom thereof.

The novel process of this invention permits the use of both dispersed, i.e. gelatinized, and granular polysaccharides. It facilitates obtaining a high acyl content in a minimum amount of reaction time without harsh pretreatment or resultant degradation of the polysaccharide molecule. The resulting grafted polysaccharide acylates exhibit the characteristics of a thermoplastic material. They display superior impact strength and are much tougher than comparable ungrafted polysaccharide acylates. Their films demonstrate great flexibility and excellent electrical insulation properties. As regards the grafted cellulose acylates of this invention, their excellent properties result, for the most part, from the presence of the grafted polymeric chains which increase the flexibility of the molecular "backbone" of the cellulose polymer chain. Thus, it becomes evident that the unique and novel improvements resulting from the process of this invention, i.e. the pregrafting of a polysaccharide prior to its esterification, serves to increase the product yield and quality of the resulting ester products without the need for a severe pretreatment or any resultant molecular degradation and also provides these derivatives with an unexpectedly high degree of internal plasticization.

Polysaccharides may be defined as polymerized sugars with glycosidic intermolecular linkages. For the purposes of this invention, they are limited to cellulose and starch and where the term polysaccharide appears in this specification, this limitation is thereby intended. The applicable starches may comprise either untreated starches or starch conversion products prepared by treatment of the starch with heat and/or acid. These starches may be derived from any source including corn, wheat, potato, tapioca, waxy maize, sago, rice and high amylose corn as well as the amylose and amylopectin fractions derived from any of the latter starch sources.

In general, the novel process of this invention begins with the evacuation of air from a reaction vessel whereupon an inert gas, such as nitrogen, is admitted. The initial grafting procedure is carried out in an inert atmosphere in order to avoid the inhibitory effect of oxygen upon the reaction. After addition of an aqueous suspension of the polysaccharide together with a portion of an ethylenically unsaturated monomer, which is preferably freshly distilled, the system is again flushed with an inert gas. The aqueous suspension of the polysaccharide should have a concentration of from about 7.5 to 35%, by weight, of the polysaccharide and the concentration of the ethylenically unsaturated monomer should be from about 5 to 125%, by weight, of the polysaccharide solids. When granular starches are used, however, the ratio of the volume of water to starch should preferably not be in excess of 2:1. A higher ratio of water to starch would result in the undesirable formation of large amounts of homopolymer.

An aqueous solution of a free radical initiator is then added and the reaction thereupon allowed to proceed. Both the reaction temperature and the reaction time are values whose choice is dependent on the pH of the resulting solution. Thus, at a low pH with a ceric ion initiator, for example, a lower temperature as from about 15 to 25° C. is preferred. On the other hand, when using peroxy initiators, higher temperatures in the range of from about 50 to 60° C. can be used. When starch is the polysaccharide which is undergoing reaction, it is best not to exceed the gelatinization temperature of the starch although this may be done if the reaction is correspondingly shortened. It is also best to avoid higher temperatures because of the possible degradation of the polysaccharide molecule during the grafting procedure. The length of the grafting procedure is dependent on the concentration of the reactions, i.e. the polysaccharide and the monomer, as well as on the temperature and pH of the reaction mixture, although in most instances the reaction time will not exceed about 2 hours.

The choice of catalyst for the above reaction is a wide one. Thus, free radical initiators, such as compounds providing ceric ions as, for example, ceric ammonium nitrate, peroxy compounds including, for example, hydrogen peroxide and benzoyl peroxide and persulfates, such as potassium persulfate, may be readily used in a concentration of from about 1 to 25%, by weight, of the ethylenically unsaturated monomer.

There is also a wide choice with regard to the selection of the ethylenically unsaturated monomer which may be used in the grafting step of the process of this invention. These may include styrene and substituted styrenes, such as vinyl toluene, chlorostyrene and alpha-methyl styrene; the acrylic and methacrylic acid esters of aliphatic alcohols, such as methyl, ethyl, propyl, butyl, isobutyl, amyl, hexyl, 2-ethylhexyl, octyl, lauryl and stearyl alcohols; acrylic acid; methacrylic acid; acrylamide; acrylonitrile; methylacrylonitrile; butadiene 1–3 and chlorobutadiene 1–3; vinyl chloride; vinyl acetate, vinyl propionate and other vinyl esters; vinyl ketones; allylidene compounds, such as allylidene diacetate; vinyl pyridine and vinyl pyrrolidone; vinylidene compounds, such as vinylidene chloride; isoprene; ethylene, propylene and tetrafluoroethylene. The concentration of the monomer may be so adjusted that a desired amount of grafted polymeric chains are introduced into the polysaccharide molecule. Thus, referring to the above noted formula illustrative of compounds of this invention, Y in the latter formula, which designates a repeating unit or mer of the grafted polymeric chain, would be:

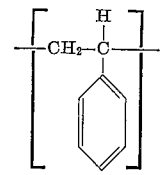

where, for example, styrene is used as the ethylenically unsaturated monomer and:

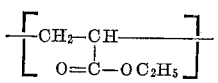

where ethyl acrylate is used.

The reaction is terminated by the addition of an aqueous solution containing from about 1 to 2%, by weight, of a polymerization inhibitor, such as hydroquinone or diphenyl amine. The grafted product is isolated, washed with an alcohol-water mixture and then dried under vacuum, at a temperature of from about 50 to 60° C., for from about 24 to 48 hours.

High efficiency of grafting in the resulting product is indicated by the high percent conversion of the monomer as well as by the percentage of polysaccharide graft polymer formed in contrast to the percentage of homopolymer formed. In all instances, the amount of graft polymer produced is in excess of about 80%, by weight, as based on the total amount of polymer formed.

The polysaccharide graft itself is characterized by its degree of polymerization. This refers to the chain length or the number of mers, i.e. the simplest chemical-structural unit in terms of which the polymer may be expressed, per graft polymer. Thus, in the grafted polysaccharide polymers of the process of this invention, the degree of polymerization is in general very high, ranging from about 2,000 to 25,000, depending on the concentration of monomer in the reaction mixture. It may be noted that in the novel grafted polysaccharide acylates of this invention, only about 0.1% of the total number of mers of the polysaccharide molecule need be grafted in order to achieve products capable of displaying all of the properties desired therein.

The second step in the novel process of this invention, i.e. the esterification of the polysaccharide graft, begins with the introduction of the dried, grafted polysaccharide into a reaction vessel. Thereupon, in the preferred embodiment of this invention, a tertiary amine, such as pyridine or quinoline, which functions as both a catalyst and as a solvent for the system is introduced and the resulting solution is thereupon preheated to a temperature of from about 100 to 115° C. for a period of from about 30 to 45 minutes. The selected acid anhydride is then added and the reaction is allowed to proceed at a temperature of from about 100 to 115° C. for a period of about 30 to 80 minutes with the preferred reaction time being about 30 minutes. The acylated product is then isolated by being slowly precipitated, with an alcohol-water mixture, in a vessel equipped with means for mechanical agitation. The resulting, fine precipitate is washed with an alcohol-water mixture until free of all traces of solvent, whereupon it is dried, under vacuum, at a temperature of from about 50 to 60° C. for a period of from about 24 to 48 hours.

Thus, by virtue of the novel process of this invention, unique grafted polysaccharide esters are prepared. These derivatives are characterized by their high degree of acylation, as evidenced by an acyl content which is only about 0.1 to 8% below the theoretical value of that for a completely acylated product. Moreover, the process is characterized by the ease and speed of reaction as well as by the high quality and yield of the resulting products.

The acylating reagents operable in the process of this invention, are acid anhydrides selected from the group consisting of acetic anhydride, propionic anhydride and butyric anhydride as well as any combination of the latter anhydrides. The acylating agent should be present in a concentration of from about 1.8 to 3.0 parts per part, by weight, of polysaccharide in the grafted polysaccharide. Where mixed acylating agents are used, the concentration of each agent is dependent on the percent, by weight, of acylated polysaccharide, of each ester group which is desired in the resulting acylated product.

The tertiary amine, which serves as both catalyst and reaction medium for the system, should be present in a concentration of about 10 to 15 parts per part, by weight, of grafted polysaccharide. Acid catalysts, such as phosphoric acid and perchloric acid, may also be used in which case a liquid organic acid, such as glacial acetic acid, is employed as the reaction medium. During the use of the latter acid catalysts, however, it is necessary to carefully control the temperature of the reaction medium in order to avoid excessive degradation of the polysaccharide backbone. When cellulose is the polysaccharide which is being acylated, this latter procedure utilizing acid catalysts is found to be the preferred method of preparation.

The novel products of this invention begin to soften at a temperature of about 190° C. They can be molded into any shape at pressures of from about 2,000 to 6,000 p.s.i. and at temperatures of from about 150 to 160° C. Upon cooling, the resulting molded forms are found to be hard and almost transparent.

The molded, acylated polysaccharide products thus obtained are thermoplastic and possess excellent electrical insulation properties. In addition, films derived from these acylated polysaccharide products are more flexible than films obtained from comparable ungrafted polysaccharide acylates. The grafted polymer chains of these products function as internal plasticizers which thus permit these novel products to yield films which are tough, stable and flexible.

The following examples will more fully illustrate the embodiment of this invention. In these examples all parts given are by weight unless otherwise noted.

EXAMPLE I

This example illustrates the preparation of a typical grafted polysaccharide intermediate which may be utilized in the novel acylation process of this invention.

The following proportions of ingredients were utilized:

|  | Parts |
|---|---|
| Corn starch | 15.000 |
| Ethyl acrylate | 18.480 |
| A solution of 0.121 part of ceric ammonium nitrate and 0.031 part of nitric acid in 31.368 parts of water | 31.520 |

A three necked vessel fitted with a reflux condenser, a high speed stirrer and an inlet for nitrogen was completely evacuated and repeatedly flushed with nitrogen. The corn starch and freshly distilled ethyl acrylate were introduced into the vessel which was again evacuated and flushed with nitrogen. The ceric ammonium nitrate solution was introduced and the reaction allowed to proceed for 30 minutes at a temperature of 25° C. The reaction was terminated by the simultaneous addition of 25 parts of a 1%, by weight, aqueous hydroquinone solution and 50 parts of ice-cold water. The resulting grafted starch product was centrifuged and washed three times with a 1:1 mixture of methanol and water. The product was then dried under vacuum at a temperature of 50° C. for a period of 48 hours. The resulting product showed a 95.53% weight increase resulting from the grafting reaction, as based on the dry weight of original corn starch. This latter figure corresponds to a degree of polymerization of 22,490 and to a 85.35% conversion of monomer, as based on the total weight of monomer.

The dried product was then extracted, with acetone, in a Sohxlet apparatus over a 72 hour period in order to determine the amount of homopolymer which had been formed. The acetone extract was evaporated and then dried under vacuum at a temperature of 50° C. for 48 hours. It was thus determined that 90.84% of the total polymer formed, comprised chains of the grafted polymer upon the starch molecule.

EXAMPLE II

This example illustrates the preparation of a typical starch ester derivative of this invention, using the grafted starch intermediate as prepared in Example I, hereinabove.

The following proportions of ingredients were utilized:

| | Parts |
|---|---|
| Polyethyl acrylate grafted corn starch (as prepared by means of the procedure of Example I) | 10.584 |
| Acetic anhydride | 16.042 |
| Pyridine | 105.840 |

The grafted starch and the pyridine were introduced into a three necked vessel fitted with a high speed stirrer and a condenser equipped with a calcium chloride drying tube. This mixture was preheated at a temperature of 115° C., for a period of 30 minutes, prior to the addition of the acetic anhydride. The complete mixture was allowed to react for 30 minutes at a temperature of 115° C. The resulting acetylated product was isolated by being precipitated from the reaction mixture by the slow addition, under agitation, of a 1:1 mixture of methanol and water. The fine, white precipitate thus obtained was washed thoroughly with the 1:1 methanol-water solution until the odor of pyridine was completely absent. The product was then dried, under vacuum, at a temperature of 50° C. for a period of 48 hours.

On analysis, it was found that the resulting product contained 36.72% of acetyl groups, as based on the weight of the acetylated starch minus the weight of the grafted polymer chains. The latter figure is thus indicative of the high degree of reaction efficiency on the part of the acetylation reaction inasmuch as the theoretical maximum percentage of acetyl groups in a completely acetylated starch ester is only 44.8%.

EXAMPLE III

This example illustrates the preparation of a typical grafted polysaccharide, i.e. cellulose, intermediate which may be utilized in the novel acylation process of this invention.

The following proportions of ingredients were utilized:

| | Parts |
|---|---|
| Cellulose | 15.000 |
| Ethyl acrylate | 4.620 |
| A solution of 0.48 part of ceric ammonium nitrate and 0.12 part of nitric acid in 194.78 parts of water | 195.380 |

The procedures used to prepare and analyze the product whose preparation is described in this example, were identical to the procedures as set forth in Example I, with the exception, in this instance, that a sixty minute reaction time was utilized.

The resulting polyethyl acrylate grafted cellulose showed a 24.73% weight increase resulting from the grafting reaction, as based on the dry weight of the original cellulose. This latter figure corresponds to a 97.24% conversion of monomer, as based on the total weight of monomer. It was further determined that 86.46% of the total polymer formed, comprised chains of the grafted polymer upon the cellulose molecule.

EXAMPLE IV

This example illustrates the preparation of a typical cellulosic ester derivative of this invention, using the grafted cellulose intermediate as prepared in Example III, hereinabove. It further illustrates the use of an acid catalyst in the acylation procedure.

The following proportions of ingredients were utilized:

| | Parts |
|---|---|
| Polyethyl acrylate grafted cellulose (as prepared by means of the procedure of Example III) | 9.5 |
| Acetic acid | 72.0 |

The grafted cellulose and the acetic acid were introduced into a three necked vessel fitted with a high speed stirrer, a thermometer and a condenser equipped with a calcium chloride drying tube. The mixture was preheated at a temperature of 37° C. for a period of about one hour. A solution of 35 parts of acetic acid admixed with 0.087 part of sulfuric acid was added and the total mix allowed to react for about 45 minutes at a temperature of 37° C. The resulting product was cooled to 18° C., whereupon 25 parts of acetic anhydride were added. Thereupon, a solution of 10 parts acetic acid admixed with 0.513 part of sulfuric acid were slowly and uniformly added over a 2 to 2½ hour period, whereupon the temperature rose and leveled off at 32-35° C. At this point, the reaction mix was quite viscous so that 50 parts of acetic acid were introduced in order to decrease the viscosity. A solution of 17 parts acetic acid admixed with 8.5 parts of water was then added over a 15 minute period, whereupon the temperature rose to 37-40° C.

The reaction mix was thereupon maintained at a temperature of 37° C. for a period of 18 hours, in order to hydrolyze the sulfate ester formed during acetylation. The resulting acetylated product was isolated by being diluted with aqueous acetic acid, the diluted product thereupon being poured, with vigorous agitation, into water which was at 22° C. The fibrous precipitate thus obtained was filtered, washed thoroughly, stabilized at a pH of 7 with a 10%, by weight, aqueous sodium bicarbonate solution, refiltered and dried, under vacuum, at a temperature of 50° C. for a period of 48 hours.

On analysis, it was found that the resulting polyethyl acrylate grafted cellulose acetate contained 41.72% of acetyl groups, as based on the weight of the acetylated cellulose minus the weight of the grafted polymer chains. This latter figure is thus indicative of the high degree of efficiency on the part of the acetylation reaction inasmuch as the theoretical maximum percentage of acetyl groups in a completely acetylated cellulose ester is only 44.8%.

EXAMPLE V

This example illustrates the complete preparation of a variety of the grafted starch acylates of this invention.

The procedures used to prepare and analyze the products whose preparation is described in this example, were identical to the comparable procedures as set forth in Examples I and II.

A. *Grafting formulation*

| | Parts |
|---|---|
| Starch | 15.000 |
| Ceric ammonium nitrate | 0.121 |
| Nitric acid | 0.031 |
| Ethyl acrylate and water—in an amount of each such that the total combined weight equals 49.848 parts. | |

B. *Acylating formulation*

| | |
|---|---|
| Grafted starch | As indicated in the following table. |
| Acetic anhydride | 2.2 parts per part of starch in grafted sample. |
| Pyridine | 10 parts per part of grafted starch. |

The results summarized in the following table, clearly show that many varieties of starch may be efficiently grafted so as to yield intermediates which may then be readily acylated.

GRAFTING REACTION DATA

| Starch type | Parts of Monomer | Percent weight increase of starch due to grafting (based on dry weight of starch) | Percent conversion of monomer (based on total weight of monomer) | Percent graft polymer (based on total weight of polymer formed) | Percent homopolymer (based on total weight of polymer formed) |
|---|---|---|---|---|---|
| Corn starch | 9.240 | 48.73 | 92.85 | 85.20 | 14.80 |
|  | 4.620 | 19.27 | 71.83 | 87.22 | 12.78 |
|  | 2.772 | 13.01 | 80.98 | 87.44 | 12.58 |
|  | 1.848 | 7.17 | 65.30 | 89.16 | 10.84 |
|  | 0.924 | 1.35 | 26.30 | 83.20 | 16.80 |
| Amylopectin | 18.480 | 87.53 | 86.10 | 82.49 | 11.75 |
|  | 9.24 | 45.13 | 90.80 | 80.75 | 19.25 |
|  | 4.62 | 21.27 | 78.10 | 88.25 | 11.75 |
| High amylose corn starch (containing 50%, by wt., amylose) | 9.24 | 51.93 | 94.28 | 89.41 | 10.59 |
|  | 4.62 | 24.94 | 89.97 | 90.01 | 9.99 |
| Acid treated cornstarch | 4.62 | 25.69 | 92.50 | 90.29 | 9.71 |
| Acid treated amylopectin | 4.62 | 26.71 | 90.68 | 95.64 | 4.36 |
| Acid treated high amylose cornstarch (containing 50%, by weight, amylose) | 9.24 | 51.12 | 89.89 | 92.32 | 7.68 |
|  | 4.62 | 24.57 | 85.67 | 93.11 | 6.89 |
| Amylose (obtained by the fractionation of potato starch) | [1] 9.240 | 49.10 | 91.52 | 87.10 | 12.90 |
|  | [1] 4.620 | 27.91 | 92.64 | 97.83 | 2.17 |
|  | [1] 2.772 | 13.53 | 78.84 | 92.86 | 7.14 |
|  | [1] 1.848 | 9.99 | 77.34 | 96.79 | 3.21 |

[1] In these examples, the ethyl acrylate and water were present in an amount of each such that the total combined weight equaled 74.774 parts. Correspondingly, 0.18 part of ceric ammonium nitrate and 0.046 part of nitric acid were present.

ACYLATION REACTION DATA

| Starch Type | Percent graft in the sample (based on the dry weight of the starch) | Time of acylation (min.) | Weight of starch in grafted starch | Weight of grafted polymer chains in grafted starch | Weight of sample after starch acylation | Percent acyl groups (based on total wt. acylated starch) |
|---|---|---|---|---|---|---|
| Corn starch grafted with polyethyl acrylate | 21.27 | 30 | 7.367 | 1.568 | 14.11 | 41.24 |
|  | 13.01 | 30 | 11.960 | 1.564 | 21.50 | 40.00 |
|  | 7.17 | 30 | 12.612 | 0.896 | 21.50 | 39.08 |
|  | 1.35 | 30 | 13.790 | 0.186 | 22.30 | 38.15 |
| Amylopectin grafted with polyethyl acrylate | 48.73 | 30 | 5.378 | 2.622 | 11.030 | 36.03 |
| High amylose corn starch (containing 50%, by weight, amylose) grafted with polyethyl acrylate | 51.93 | 30 | 7.228 | 3.754 | 15.356 | 37.70 |
|  | 24.94 | 30 | 7.048 | 1.758 | 13.120 | 38.03 |
| Acid treated corn starch grafted with polyethyl acrylate | 25.69 | 30 | 7.340 | 1.876 | 13.864 | 38.75 |
| Acid treated amylopectin grafted with polyethyl acrylate | 26.71 | 30 | 7.267 | 1.943 | 13.825 | 38.83 |
| Acid treated high amylose corn starch (containing 50%, by weight, amylose) grafted with polyethyl acrylate | 51.12 | 30 | 11.33 | 5.800 | 24.35 | 38.91 |
|  | 24.57 | 30 | 12.09 | 3.960 | 22.70 | 38.76 |
| Amylose grafted with polyethyl acrylate | 49.10 | 30 | 43.65 | 14.370 | 62.19 | 38.77 |
|  | 27.91 | 30 | 7.223 | 2.016 | 13.278 | 35.87 |
|  | 13.53 | 30 | 11.21 | 1.517 | 20.47 | 41.32 |
|  | 9.99 | 30 | 11.515 | 1.061 | 20.64 | 41.18 |

EXAMPLE VI

This example illustrates the preparation of the novel grafted starch esters of this invention wherein butyl acrylate is the monomer utilized as the grafting agent.

The procedures used to prepare and analyze the formulations of this example, as set forth below, were identical to the procedures as described in Examples I and II, hereinabove.

A. *Grafting formulation*

```
                                                          Parts
Starch _____ 15.000
Ceric ammonium nitrate _____  0.121
Nitric acid _____  0.031
Butyl acrylate and water—in an amount of each
    such that the total combined weight equals
    49.848 parts.
```

B. Acylation formulation

Grafted starch _____ As indicated in the following table.
Acetic anhydride _____ 2.2 parts per part of starch in grafted sample.
Pyridine _____ 10 parts per part of grafted starch.

It will be observed from the results in the following table, that polybutyl acrylate can be efficiently grafted onto a variety of starches and the resulting grafted starches can be thereupon be readily acylated.

| Polyethyl acrylate grafted starch (as prepared by means of Ex. I) | Parts | | | |
|---|---|---|---|---|
| | 1 | 2 | 3 | 4 |
| | As indicated in the following table | | | |
| Acetic anhydride | | | 2.0 | 2.0 |
| Propionic anhydride | 2.2 | | 2.2 | |
| Butyric anhydride | | 2.2 | | 2.2 |
| Pyridine | 10 parts per part of grafted starch | | | |

GRAFTING REACTION DATA

| Starch type | Parts of Monomer | Percent weight increase of starch due to grafting (based on dry weight of starch) | Percent conversion of monomer (based on total weight of monomer) | Percent graft polymer (based on total weight of polymer formed) | Percent homopolymer (based on total weight of polymer formed) |
|---|---|---|---|---|---|
| Corn starch | 9.24 | 42.40 | 82.91 | 85.42 | 14.58 |
| | 4.62 | 20.52 | 82.34 | 83.25 | 16.75 |
| Amylopectin | 9.24 | 40.06 | 74.16 | 90.24 | 9.76 |
| | 4.62 | 22.50 | 89.17 | 84.30 | 15.70 |
| Amylose (obtained from the fractionation of potato starch) | ¹9.24 | 46.11 | 87.16 | 85.89 | 14.11 |
| | ¹4.62 | 25.63 | 88.26 | 94.44 | 5.56 |

¹ In these examples, the butyl acrylate and water were present in an amount of each such that the total combined weight equaled 74.774 parts. Correspondingly, 0.18 part of ceric ammonium nitrate and 0.046 part of nitric acid were present.

ACYLATION REACTION DATA

| Starch Type | Percent graft in the sample (based on the dry weight of the starch) | Time of acylation (min.) | Weight of starch in grafted starch | Weight of grafted polymer chains in grafted starch | Weight of sample after acylation | Percent acyl groups (based on total wt. acylated starch) |
|---|---|---|---|---|---|---|
| Corn starch grafted with polybutyl acrylate | 42.40 | 30 | 7.57 | 3.21 | 15.50 | 38.40 |
| | 20.52 | 30 | 7.76 | 1.55 | 14.02 | 37.77 |
| Amylopectin grafted with polybutyl acrylate | 40.06 | 30 | 7.20 | 2.88 | 14.50 | 38.04 |
| | 22.50 | 30 | 7.28 | 1.63 | 13.11 | 36.58 |
| Amylose grafted with polybutyl acrylate | 46.11 | 30 | 5.92 | 3.12 | 13.21 | 40.80 |
| | 25.63 | 30 | 14.64 | 3.76 | 27.49 | 41.10 |

EXAMPLE VII

This example illustrates the preparation of the novel grafted starch esters of this invention wherein acylating agents other than acetic anhydride are utilized. It further illustrates the preparation of a mixed acylate of a grafted starch by the simultaneous use of two different acylating agents.

The procedures used in preparing the formulations of this example, as described below, were identical to the procedures as described in Example II, hereinabove.

The proportions of each of the acid anhydrides used in the above described formulations are based on the parts, by weight, of starch in the grafted starch intermediate.

The results summarized in the following table, clearly indicate that grafted starches can be acylated to a high degree in a short reaction period by employing a variety of acylating agents either individually or in admixture with one another.

ACYLATION REACTION DATA

| Acylating Agent | Starch type | Percent graft in the sample (based on dry weight of starch) | Time of acylation (min.) | Weight of starch in grafted starch | Weight of grafted polymer chains in grafted starch | Weight of sample after acylation | Percent acyl groups (based on total wt. acylated starch) |
|---|---|---|---|---|---|---|---|
| Propionic anhydride | Corn starch grafted with polyethyl acrylate (propionate). | 21.77 | 40 | 5.85 | 2.650 | 12.66 | 41.64 |
| | | 21.77 | 80 | 6.16 | 2.790 | 13.98 | 44.95 |
| | | 13.01 | 30 | 5.65 | 0.741 | 10.38 | 41.40 |
| | | 13.01 | 80 | 7.37 | 0.967 | 13.97 | 43.34 |
| Butyric anhydride | Corn starch grafted with polyethyl acrylate (butyrate). | 21.77 | 40 | 5.95 | 2.680 | 13.62 | 45.76 |
| | | 21.77 | 80 | 5.59 | 2.530 | 13.28 | 48.00 |
| | | 13.01 | 80 | 7.21 | 0.950 | 14.90 | 48.32 |
| Acetic and propionic anhydride. | Corn starch grafted with polyethyl acrylate (acetatepropionate). | 13.01 | 80 | 6.97 | 0.915 | 13.10 | 46.79 |
| Acetic and butyric anhydride. | Corn starch grafted with polyethyl acrylate (acetatebutyrate). | 13.01 | 30 | 6.52 | 0.856 | 11.81 | 44.80 |
| | | 13.01 | 80 | 7.80 | 1.023 | 14.75 | 46.80 |

Summarizing, it is seen that this invention provides a unique process for the synthesis of grafted polysaccharide ester derivatives and the products obtained thereby.

Variations may be made in proportions, procedures and materials without departing from the scope of this invention as defined by the following claims.

I claim:

1. A process for preparing polysaccharide esters which comprises the simultaneous polymerization and grafting of an ethylenically unsaturated monomer onto the molecule of a polysaccharide, and reacting the grafted polysaccharide with an acylating agent in the presence of a catalyst; said acylating agent being selected from the group consisting of acetic anhydride, propionic anhydride, butyric anhydride and any combination of the latter anhydrides.

2. A process for preparing polysaccharide esters, wherein mers of said ester correspond to the following formula:

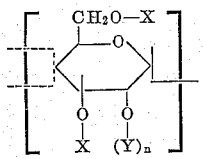

wherein X is an acyl radical selected from the group consisting of the acetate, propionate and butyrate radicals and mixtures of said radicals; wherein Y is the repeating unit of a grafted polymeric chain; and, wherein $n$ is an integer having a value of at least 100; said process comprising the simultaneous polymerization and grafting of an ethylenically unsaturated monomer onto the molecule of a polysaccharide resulting in the grafted polymeric chain, and thereupon reacting the grafted polysaccharide with an acylating agent producing said acyl radical in the presence of a catalyst.

3. The process of claim 2, wherein the acylating agent is an acid anhydride selected from the group consisting of acetic anhydride, propionic anhydride, butyric anhydride, and any combination of said anhydrides; said acylating agents being present in concentrations of from about 1.8 to 3.0 parts, by weight, per part of polysaccharide in the grafted polysaccharide.

4. The process of claim 2, wherein said polysaccharide is selected from the group consisting of cellulose and starch.

5. The process of claim 2, wherein the amount of said ethylenically unsaturated monomer is from about 5 to 125%, by weight, of said polysaccharide.

6. The process of claim 2, wherein the degree of polymerization of the total amount of grafted polymeric groups upon said polysaccharide ester ranges from about 2,000 to 25,000.

7. The process of claim 2, wherein said catalyst in the acylating reaction is selected from the group consisting of tertiary amines and inorganic mineral acids.

8. A polysaccharide ester wherein mers of said ester correspond to the following formula:

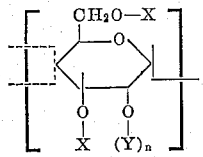

wherein X is an acyl radical selected from the group consisting of acetate, propionate and butyrate radicals and mixtures of said radicals; wherein Y is the repeating unit of a grafted polymeric chain of an ethylenically unsaturated monomer; and, wherein $n$ is an integer having a value of at least 100.

9. The polysaccharide ester of claim 8, wherein said polysaccharide is selected from the group consisting of cellulose and starch.

10. The polysaccharide ester of claim 8, wherein the degree of polymerization of the total amount of said grafted polymeric groups upon said polysaccharide ester ranges from about 2,000 to 25,000.

References Cited

UNITED STATES PATENTS 3,127,362  4/1964  Cohen et al. _____ 260—17.4

SAMUEL H. BLECH, *Primary Examiner.*

WILLIAM H. SHORT, *Examiner.*

J. NORRIS, *Assistant Examiner.*